March 15, 1938. K. E. SUMMERS 2,111,252

SCREW GAUGING MACHINE

Filed Feb. 8, 1937

Inventor:
Kenneth Edward Summers

UNITED STATES PATENT OFFICE 2,111,252

SCREW GAUGING MACHINE

Kenneth Edward Summers, Peterborough, England, assignor to The Newall Engineering Company Limited, Peterborough, England Application February 8, 1937, Serial No. 124,617
In Great Britain February 17, 1936

4 Claims. (Cl. 209—82)

Gauging machines are known wherein articles such as rollers and the like are picked up from a feeding mechanism by a rotary conveyor in the path of which gauge members are arranged adapted to eject the articles from the conveyor or to let them pass according to whether they are above or below a given size, thereby effecting a sorting of the articles according to size.

The present invention relates to an apparatus of this kind for gauging or checking screw-threaded components, and consists essentially in the provision of a conveyor having means for gripping the screws or bolts in axial direction and passing them between gauging members of the usual screw-gauge type grouped concentrically about the axis of the conveyor.

The grippers are composed of pairs of radial arms pivotally movable under spring control in planes which are radial to the conveyor shaft.

Figure 1:
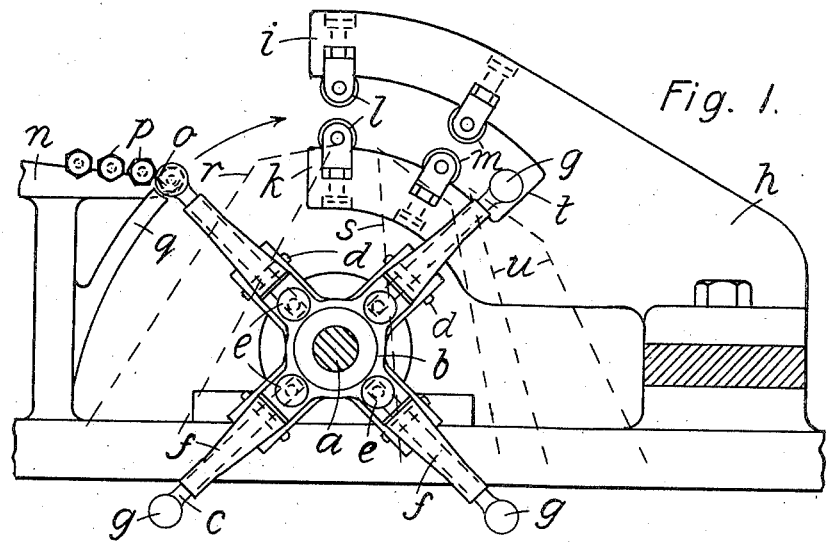
Figure 2:
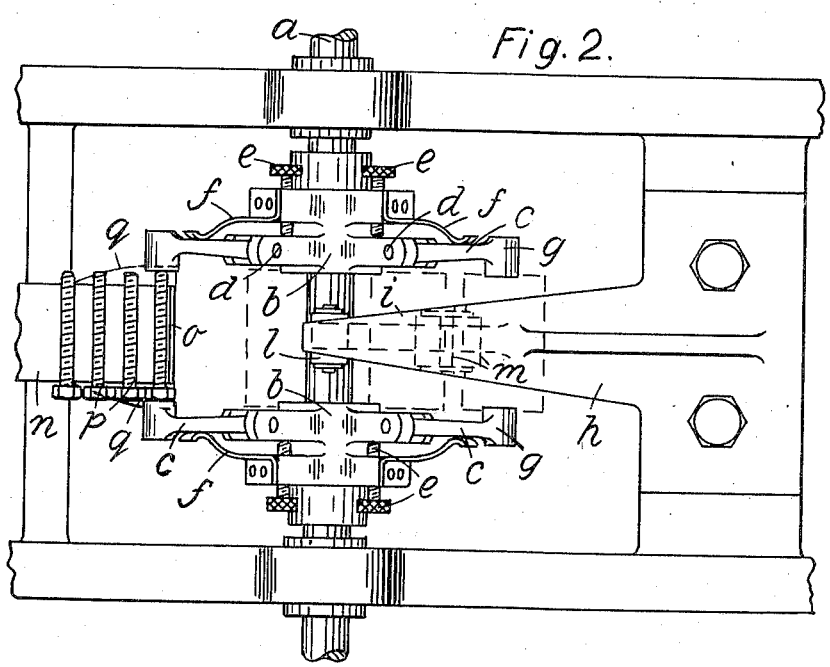

The invention is illustrated by way of example in the accompanying drawing,

Fig. 1 representing a sectional side view of the essential parts of an apparatus constructed according to the invention, and Fig. 2 a plan view thereof.

The illustrated apparatus comprises a rotary shaft $a$ on which two spiders $b$ are mounted in spaced relationship. Each spider has four arms, and each of the latter has an outer portion $c$ which is pivotally movable in a plane which is radial relative to the shaft $a$. The arm portions $c$ are extended inwards beyond the pivots $d$ for engagement with adjustable screw abutments $e$ against which they are held by springs $f$. Each arm has at its outer end a head $g$.

A bracket $h$, which overhangs the shaft $a$ between the spiders, is formed with two jaws $i$ and $k$ wherein gauging members for the threaded components are mounted. There is one pair of "go" members $l$ and one pair of "not go" members $m$. These members are arranged so that the gap between each pair is at the same radial distance from the shaft $a$ as the heads of the arms $c$. The members may either be threaded in the same way as the components or formed with angular ribs shaped in conformity with the threads.

The components $p$ to be checked are fed from a hopper on to a guideway $n$ along which they pass in a single file to a pick-up station $o$ arranged between the paths followed by the heads $g$ of the arms $c$. The arms $c$ are set by means of the screws $e$ so that the distance between co-operating heads $g$ is less than the length of the components $p$, and cam faces $q$ are provided which are swept by the heads $g$ and which spread the latter apart sufficiently to enable them to clear and, when released, to grip the components one by one in the axial direction thereof, as the arms pass the pick-up station. Each component thus picked up by the arms will be conveyed by the latter in the direction of the arrow and presented to the gauging members. The "go" members $l$ are set to the prescribed maximum tolerance, and should a component be above this tolerance, the gauging members themselves will eject the work inasmuch as the spring tension is set only just to carry through the maximum diameter. The ejected work drops on to a chute $r$ and is led thereby into a receptacle. If the component is below the maximum size and above the minimum size, then the said component will be ejected by the "not go" members $m$ and pass as satisfactory on all elements. These components are taken up by a chute $s$ and led to a separate receptacle. Should the component be below the minimum size it will obviously be carried through both pairs of rollers, and it will then be ejected by an abutment $t$ and received by a chute $u$ for separate collection.

It will be seen from the foregoing that the machine will mechanically check all the elements of the thread in the same way as is at present accomplished by manual inspection when using calliper or snap form of thread gauges.

I claim:

1. A screw-gauging machine comprising a conveyor, co-operating gripping members on said conveyor relatively displaceable transversely to the direction of travel, means for supporting screws in the path of said gripping members and in axial alignment with the latter, means operative to displace the gripping members for clearing the screws and for gripping and conveying them when in axial alignment therewith, pairs of "go" and "not go" screw gauges arranged in the path of the conveyed screws, a stop for ejecting from the grippers screws which are not ejected by said gauges, and means for collecting the screws at each ejecting point.

2. A screw-gauging machine comprising a rotary shaft, pairs of radial arms mounted on said shaft, each pair of arms being pivotally movable in a plane which is radial to the shaft, gripping heads at the free ends of the arms, means for controlling the positions of the arms, means for supporting screws in the path of said heads and in axial alignment with the latter, means for opening out the arms to clear the screws, means operative to apply said heads to the screws for gripping and conveying the latter when in axial alignment therewith, pairs of "go" and "not go" screw gauges arranged in the path of the conveyed screws, a stop for ejecting from the grippers screws which are not ejected by said gauges, and means for collecting the screws at each ejecting point.

3. A screw-gauging machine comprising a rotary shaft, pairs of radial arms mounted on said shaft, each pair of arms being pivotally movable in a plane which is radial to the shaft, gripping heads at the free ends of the arms, means for supporting screws in the path of said heads and in axial alignment with the latter, adjustable stops adapted to maintain the arms with their heads at a distance from each other shorter than the length of the screws, springs maintaining the arms normally in contact with the stops, means operative to open out the arms to clear the screws and to release the arms for gripping and conveying the screws when the gripping heads are in axial alignment with the screws, pairs of "go" and "not go" screw gauges arranged in the path of the conveyed screws, a stop for ejecting from the gripper heads screws which are not ejected by said gauges, and means for collecting the screws at each ejecting point.

4. A screw-gauging machine as claimed in claim 3 wherein the means for opening out and releasing the arms consists of cam faces arranged in position to be swept by the heads of the arms.

KENNETH EDWARD SUMMERS.